United States Patent
Williams, Jr. et al.

(10) Patent No.: US 6,428,081 B1
(45) Date of Patent: Aug. 6, 2002

(54) WATER SHIELD HAVING INTEGRATED WIRING

(75) Inventors: Robert Joseph Williams, Jr., Troy; Brian Matthew Stipes, Sterling Heights; Douglas Howard Turner, Troy, all of MI (US)

(73) Assignee: Cadillac Products, Inc., Troy, MI (US)

( * ) Notice: Subject to any disclaimer, the term of this patent is extended or adjusted under 35 U.S.C. 154(b) by 0 days.

(21) Appl. No.: 09/301,673

(22) Filed: Apr. 28, 1999

(51) Int. Cl.$^7$ ................................................. B60J 5/00
(52) U.S. Cl. ................ 296/146.7; 296/39.1; 296/146.1; 296/146.2; 49/502; 49/503
(58) Field of Search ........................... 296/39.1, 39.3, 296/146.1, 146.2, 146.7; 49/502, 503; 277/627, 650, 924

(56) References Cited

U.S. PATENT DOCUMENTS

| | | |
|---|---|---|
| 3,471,900 A | 10/1969 | Burns |
| 3,542,328 A | 11/1970 | Deitrick |
| 3,840,627 A | 10/1974 | Rhodes |
| 4,035,466 A | 7/1977 | Langecker |
| 4,066,269 A * | 1/1978 | Linne .......................... 277/228 |
| 4,081,879 A | 4/1978 | Rubright |
| 4,715,802 A | 12/1987 | Arai |
| 4,765,673 A | 8/1988 | Frabotta et al. |
| 4,815,984 A * | 3/1989 | Sugiyama et al. .......... 439/211 |
| 4,824,164 A * | 4/1989 | Nakayama et al. ......... 296/146 |
| 4,834,398 A * | 5/1989 | Guzowski et al. ...... 277/207 A |
| 4,856,795 A | 8/1989 | DeLano et al. |
| 4,873,132 A | 10/1989 | Jones et al. |
| 4,924,630 A * | 5/1990 | Lomasney et al. ............ 49/502 |
| 4,954,307 A | 9/1990 | Yokoyama |
| 4,957,803 A | 9/1990 | Foley |
| 4,961,713 A | 10/1990 | McCracken et al. |
| 5,074,771 A | 12/1991 | Thakrar et al. |
| 5,178,927 A | 1/1993 | Turner |
| 5,182,032 A | 1/1993 | Dickie et al. |
| 5,275,546 A | 1/1994 | Fierkens |
| 5,294,169 A * | 3/1994 | Roy et al. ................. 296/146.5 |
| 5,296,068 A | 3/1994 | Turner |
| 5,316,463 A | 5/1994 | Neu |
| 5,322,722 A | 6/1994 | Rozenberg |
| 5,344,601 A | 9/1994 | Newton |
| 5,374,176 A | 12/1994 | Jang |
| 5,409,779 A | 4/1995 | Puckett et al. |
| 5,456,513 A * | 10/1995 | Schmidt ..................... 296/39.1 |
| 5,482,343 A | 1/1996 | Bradac |
| 5,524,907 A * | 6/1996 | Walser ........................ 277/189 |
| 5,530,989 A | 7/1996 | Remmert et al. |
| 5,582,789 A | 12/1996 | Stein et al. |
| 5,584,144 A * | 12/1996 | Hisano ......................... 49/502 |
| 5,588,260 A | 12/1996 | Suzuki et al. |
| 5,656,215 A | 8/1997 | Eckardt et al. |
| 5,659,924 A | 8/1997 | Gildersleeve |
| 5,688,015 A | 11/1997 | Patterson et al. |
| 5,730,446 A * | 3/1998 | Taylor et al. ................ 277/312 |
| 5,735,041 A | 4/1998 | Zaguskin et al. |
| 5,743,010 A * | 4/1998 | Zaguskin et al. ............. 29/857 |
| 5,823,069 A | 10/1998 | Roark et al. |
| 5,902,004 A | 5/1999 | Waltz et al. |
| 5,904,002 A * | 5/1999 | Emerling et al. .............. 49/502 |
| 5,931,682 A * | 8/1999 | Takiguchi et al. ............ 439/34 |
| 5,936,818 A * | 8/1999 | Maue et al. ................... 361/93 |
| 5,975,622 A | 11/1999 | Koopman, Jr. |
| 6,000,959 A * | 12/1999 | Curtindale et al. ......... 439/247 |
| 6,029,403 A * | 2/2000 | Bertolini et al. .............. 49/502 |

OTHER PUBLICATIONS

Article entitled "Choosing a Multi–Material Molding Process," Jan. 1998—Molding Systems.

* cited by examiner

Primary Examiner—Stephen T. Gordon
Assistant Examiner—Lori L Coletta
(74) Attorney, Agent, or Firm—Harness, Dickey & Pierce, P.L.C.

(57) ABSTRACT

A door for a motor vehicle. The door comprises an outer panel, a trim panel and a water shield. The water shield includes, a rigid substrate and a wire harness. The wire harness has a first terminal communicating with at least one actuator of the outer panel a second terminal communicating with at least one switch of the trim panel, and a connecting portion. The connection portion electrically connects the first and second terminals, and is substantially encapsulated within the substrate.

18 Claims, 2 Drawing Sheets

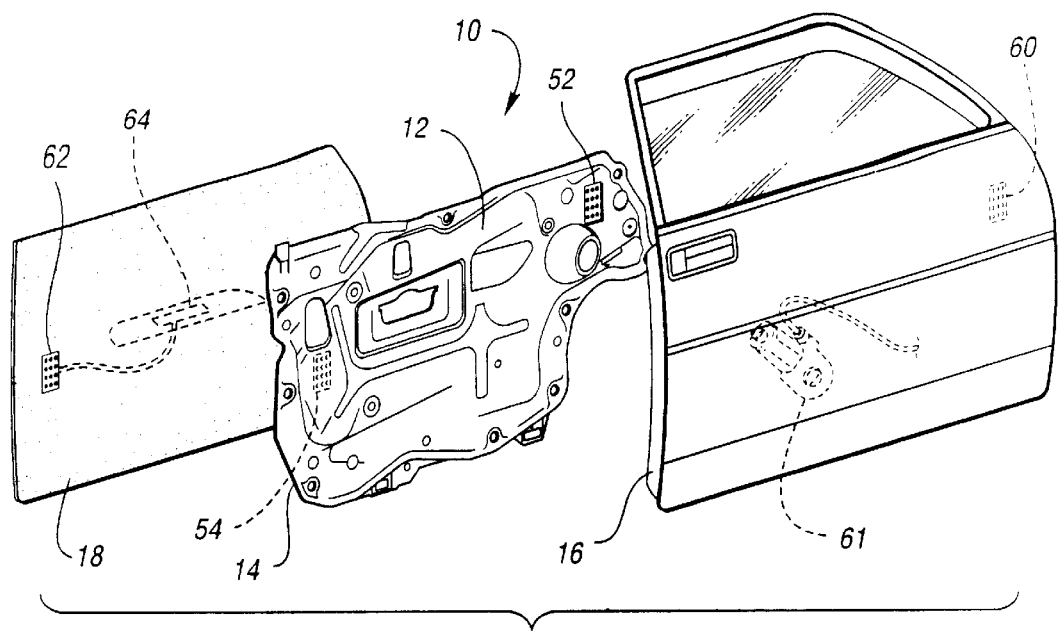
*Fig. 1*
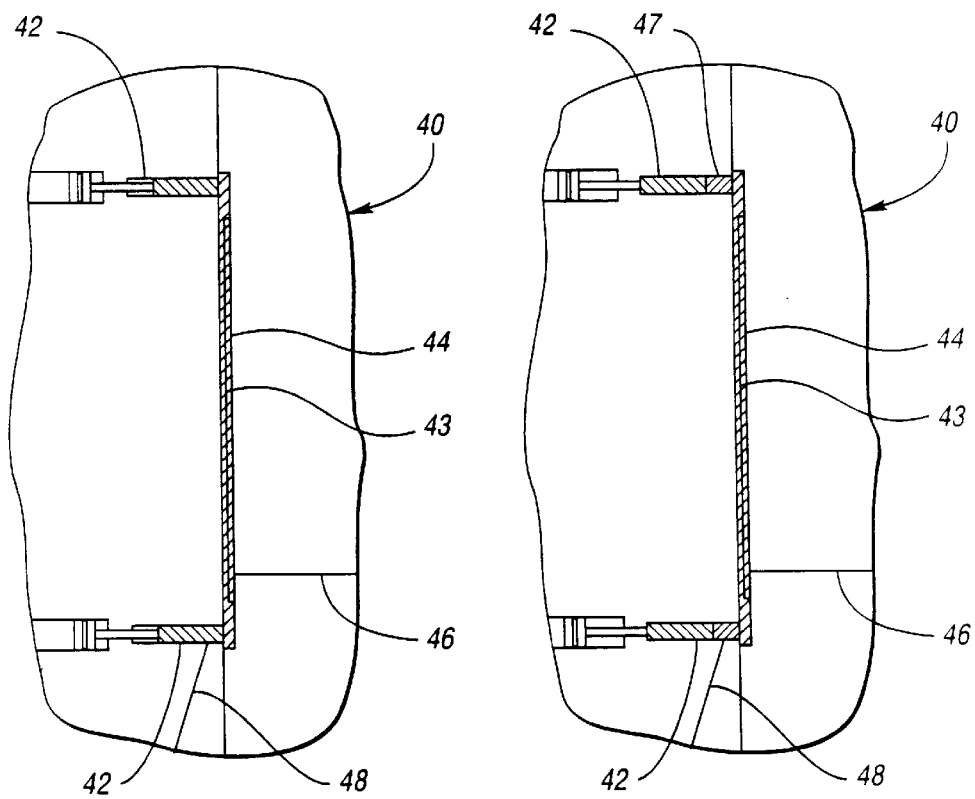
*Fig. 2*  *Fig. 3*

WATER SHIELD HAVING INTEGRATED WIRING

TECHNICAL FIELD

This invention relates to water shields for motor vehicle doors, and more particularly to a rigid water shield having integrated wiring.

BACKGROUND ART

Doors for motor vehicles normally have openings through which components such as door locks and handles are mounted. In order to prevent water from penetrating from the outside of the door through the door openings, water shields are typically provided. Often such water shields are formed from a flexible membrane. For example, U.S. Pat. No. 4,957,803 shows a water deflector with wire harness seal. During application of a flexible water shield to the vehicle door, however, problems often arise with proper orientation of the water shield and completing its seal with the door. Rigid water shields are also known, and have fewer orientation problems because they are frequently equipped with built-in retainer clips that mate with predetermined locations on the door.

DISCLOSURE OF INVENTION

The present invention is a water shield for a motor vehicle. The water shield comprises a rigid substrate and a wire harness. The wire harness has a first terminal, a second terminal, and a connecting portion electrically connecting the first and second terminals. The connecting portion of the wire harness is substantially encapsulated within the substrate.

Accordingly, an object of this invention is to provide a rigid water shield.

Another object of this invention is to provide a water shield of the type described above which integrates the wire harness with the water shield.

Still another object of this invention is to provide a door for a motor vehicle that includes a water shield of the type described above.

These and other objects, features, and advantages of the present invention are readily apparent from the following detailed description of the best mode for carrying out the invention when taken in conjunction with the accompanying drawings.

BRIEF DESCRIPTION OF DRAWINGS

FIG. 1 is an exploded perspective view of a motor vehicle door including a water shield according to the present invention;

FIG. 2 is a schematic cross-sectional view of a mold for forming the water shield showing a core in an extended position;

FIG. 3 is a schematic cross-sectional view of the mold showing the core in a retracted position;

BEST MODE FOR CARRYING OUT THE INVENTION

Figure 4:
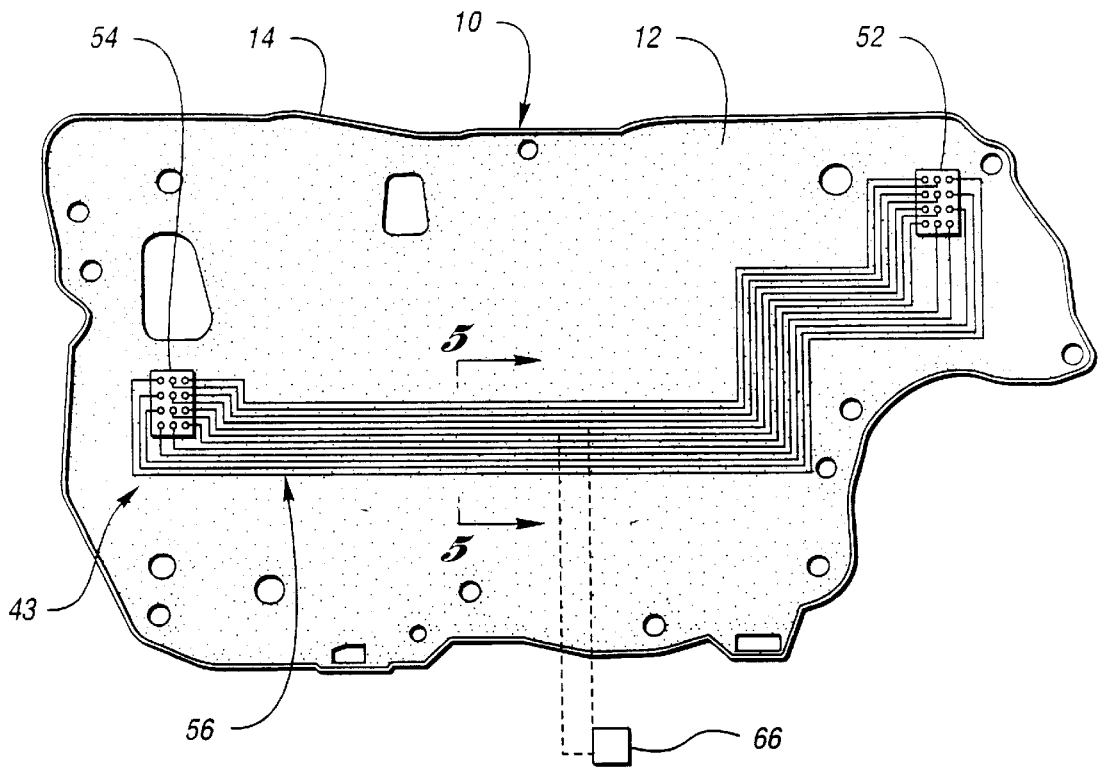
FIG. 4 is a front view of the water shield with an upper surface removed.

With reference to the drawings, the preferred embodiments of the present invention will be described. FIG. 1 shows a water shield or deflector 10 formed according to the present invention. The water shield 10 includes a rigid, generally planar substrate 12 and a relatively flexible sealing gasket 14 disposed proximate a periphery of the substrate. When attached to a motor vehicle outer door 16 between the outer door and an interior trim panel 18, the water shield 10 inhibits the passage of water, sound, air and dirt from outside of the outer door through the water shield. Further details of this purpose may be found in U.S. Pat. No. 5,409,779 entitled Shield For Water And Sound, the disclosure of which is hereby incorporated by reference.

The water shield 10 is formed according to a method shown in FIGS. 2 and 3. The method comprises providing a mold 40 having a cavity with the general shape of the water shield 10. The mold 40 also has a movable core 42. A wire harness 43 is suspended or otherwise located in the cavity, and with the movable core 42 in an extended position as shown in FIG. 2, a first molten plastic 44 is injected through one or more gates 46 and into the mold 40 to form the substrate 12 of the water shield 10. The first plastic preferably comprises acrylonitrile butadiene styrene (ABS) or a molten thermoplastic.

After allowing the first plastic to cure for some period of time, on the order of about sixty seconds, the core 42 is then withdrawn to a retracted position shown in FIG. 3. At this time, a second molten plastic 47 is injected in a continuous, closed loop bead into the mold 40 through one or more gates 48 and proximate the first plastic 44 and proximate the periphery of the substrate. The second plastic preferably comprises a substance such as silicone or thermoplastic olefin (TPO). The second plastic must bond sufficiently to the substrate material during the molding process, while at the same time being sufficiently releasable in use from contact with sheet metal after the passage of several years or more. Another desirable feature of the second plastic is that it have a relatively soft, rubber-like feel such as material 3-8186 available from Dow Coming Corporation of Plymouth, Mich. and possibly described in U.S. Pat. No. 4,322,518, the disclosure of which is hereby incorporated by reference. Particular combinations of materials that work together are disclosed in U.S. Pat. No. 5,530,989 and U.S. Pat. No. 5,823,069, the disclosures of which are also hereby incorporated by reference.

The first plastic is then cooled to form the rigid plastic substrate 12 having a first durometer hardness at ambient temperature of at least about 84 Shore A, and most preferably about 104 Rockwell R. The second plastic is likewise cooled to form the sealing gasket 14, which has a second, softer durometer of about 10 to about 70, and most preferably about 20, Shore OO.

Figure 5:
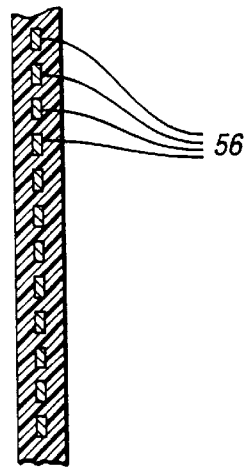
FIG. 5 is a cross-sectional view taken along line 5—5 in FIG. 4.

FIGS. 4 and 5 show the final position of the wire harness 43 in the substrate 12. The wire harness has a pair of plugs or terminals 52 and 54, and a connecting portion 56 substantially encapsulated or embedded within the substrate 12. The connecting portion 56 includes a series of wires running between posts or pins on the respective terminals to electrically connect the terminals, one or more of which might be inactive if fewer than all of the lines are required for the number of components on the vehicle. The first terminal 52 faces generally perpendicularly to the substrate 12 from an obverse side of the substrate, and mates with a receptor 60 on the outer door outer 16 to communicate with an actuator such as a window regulator 61. The second terminal 54 also faces generally perpendicularly to a reverse side of the substrate and generally opposite from the first terminal 52, and communicates through a receptor 62 with switches on the trim panel 18 such as a power window switch 64. Other switches that may be employed include power seat switches, power lock switches, power window controllers, rear view mirror controls, and other conventional switches. Additionally, the water shield 10 may be provided with a receptor for an external switch 66 that plugs into the receptor after the water shield is formed.

After the water shield cures, it is removed from the mold and normally inventoried. At the assembly point, the water shield 14 is mated to the outer door 16 in any conventional manner.

It should be understood that while the forms of the invention shown and described above constitute preferred embodiments of the invention, they are not intended to illustrate all possible forms thereof. For instance, the present invention may be used to form components of any close out system such as that between the trunk and passenger compartments, or the engine and passenger compartments, in a motor vehicle. It should also be understood that the words used are words of description rather than limitation, and various changes may be made without departing from the spirit and scope of the invention disclosed.

What is claimed is:

1. A water shield for a motor vehicle, the water shield comprising:
   a rigid plastic substrate including a gasket, the gasket having a first hardness less than a second hardness of the substrate; and
   a wire harness having a first terminal, a second terminal, and a connecting portion electrically connecting the first and second terminals, the connecting portion of the wire harness being substantially encapsulated within the substrate.

2. The water shield of claim 1 wherein the substrate has first and second sides, and the first terminal is disposed on the first side of the substrate and the second terminal is disposed on the second side of the substrate.

3. The water shield of claim 1 wherein the substrate is generally planar, and the first terminal faces generally perpendicularly to the substrate.

4. The water shield of claim 3 wherein the second terminal faces generally perpendicularly to the substrate and generally opposite from the first terminal.

5. The water shield of claim 1 wherein the substrate comprises thermoplastic.

6. The water shield of claim 1 wherein the substrate comprises ABS.

7. The water shield of claim 1 wherein the gasket is disposed proximate a periphery of the substrate.

8. The water shield of claim 1 wherein the gasket comprises silicone.

9. The water shield of claim 1 wherein the gasket comprises TPO.

10. A door for a motor vehicle, the door comprising:
    an outer panel having at least one actuator;
    a trim panel having at least one switch; and
    a water shield including:
       a rigid plastic substrate including a gasket, the gasket having a first hardness less than a second hardness of the substrate; and
       a wire harness having a first terminal communicating with the at least one actuator, a second terminal communicating with the at least one switch, and a connecting portion electrically connecting the first and second terminals, the connecting portion of the wire harness being substantially encapsulated within the substrate.

11. The water shield of claim 10 wherein the substrate has first and second sides, and the first terminal is disposed on the first side of the substrate and the second terminal is disposed on the second side of the substrate.

12. The water shield of claim 10 wherein the substrate is generally planar, and the first terminal faces generally perpendicularly to the substrate.

13. The water shield of claim 12 wherein the second terminal faces generally perpendicularly to the substrate and generally opposite from the first terminal.

14. The water shield of claim 10 wherein the substrate comprises thermoplastic.

15. The water shield of claim 10 wherein the substrate comprises ABS.

16. The water shield of claim 10 wherein the gasket is disposed proximate a periphery of the substrate.

17. The water shield of claim 16 wherein the gasket comprises silicone.

18. The water shield of claim 16 wherein the gasket comprises TPO.

* * * * *